(12) United States Patent
Yu et al.

(10) Patent No.: US 9,417,314 B2
(45) Date of Patent: Aug. 16, 2016

(54) SERVER MANAGEMENT SYSTEM AND SERVER MANAGEMENT METHOD

(71) Applicant: Wistron Corporation, New Taipei (TW)

(72) Inventors: Pei-Ling Yu, New Taipei (TW);
Dong-Hsing Su, New Taipei (TW);
Wei-Cherng Liao, New Taipei (TW);
Bing-Kun Syu, New Taipei (TW);
Shih-Tang Shen, New Taipei (TW)

(73) Assignee: Wistron Corporation, New Taipei (TW)

( * ) Notice: Subject to any disclaimer, the term of this patent is extended or adjusted under 35 U.S.C. 154(b) by 370 days.

(21) Appl. No.: 14/267,925

(22) Filed: May 2, 2014

(65) Prior Publication Data

US 2015/0192659 A1    Jul. 9, 2015

(30) Foreign Application Priority Data

Jan. 3, 2014   (TW) .............................. 103100267 A

(51) Int. Cl.
*G01S 3/02* (2006.01)
*G01S 5/10* (2006.01)
*G01S 5/08* (2006.01)
*H04L 12/24* (2006.01)

(52) U.S. Cl.
CPC ... *G01S 5/10* (2013.01); *G01S 5/08* (2013.01); *H04L 12/24* (2013.01)

(58) Field of Classification Search
USPC ........ 342/443, 457, 458, 464; 455/456.3, 457
See application file for complete search history.

(56) References Cited

U.S. PATENT DOCUMENTS

| | | | |
|---|---|---|---|
| 2007/0013510 A1* | 1/2007 | Yamada | G01S 13/74 340/539.1 |
| 2008/0291784 A1* | 11/2008 | Yamanaka | B06B 1/02 367/99 |
| 2010/0245050 A1* | 9/2010 | Shiotsu | G01S 13/82 340/10.3 |
| 2016/0116569 A1* | 4/2016 | Lim | G01S 5/26 367/117 |

FOREIGN PATENT DOCUMENTS

WO    2013019135 A2    2/2013

* cited by examiner

*Primary Examiner* — Dao Phan
(74) *Attorney, Agent, or Firm* — Winston Hsu; Scott Margo

(57) ABSTRACT

A server management system disposes two wave generators on a rack and disposes a wave sensor on a server, wherein each of the wave generators is capable of emitting an omni-directional wave and a directional wave. When the wave sensor senses the omni-directional wave and the directional wave at different time points, one of the server and a host device is capable of determining two angles of the wave sensor relative to the two wave generators according to time differences and then calculating a position of the server located in the rack according to the two angles.

8 Claims, 8 Drawing Sheets

SERVER MANAGEMENT SYSTEM AND SERVER MANAGEMENT METHOD

BACKGROUND OF THE INVENTION

1. Field of the Invention

The invention relates to a server management system and a server management method and, more particularly, to a server management system and a server management method capable of automatically calculating a position of a server located in a rack.

2. Description of the Prior Art

An information technology (IT) room in many enterprises, government units or service providers nowadays always disposes various servers, such as computing server, storage server, network server, and so on. In general, the server is disposed in a rack and a remote host device can provide a server management interface for rendering that which servers are disposed in each rack. When a specific server sends an alarm out, a manager can find the position of the server located in the rack easily from the server management interface. At present, the manager has to maintain a server management database manually, such that the server management interface can render the correct position of each server located in the rack anytime. If a server is moved to another position or a server is added or removed while the manager does not update the server management database immediately, the server management interface will render wrong information, such that the manager will not know the real status of each server well in time.

SUMMARY OF THE INVENTION

The invention provides a server management system and a server management method capable of automatically calculating a position of a server located in a rack, so as to solve the aforesaid problems.

According to the claimed invention, a server management system comprises a rack; a first wave generator disposed on the rack and used for emitting a first omni-directional wave and a first directional wave; a second wave generator disposed on the rack and used for emitting a second omni-directional wave and a second directional wave; a server disposed in the rack; a wave sensor disposed on the server, the wave sensor sensing the first omni-directional wave at a first time point, sensing the first directional wave at a second time point, sensing the second omni-directional wave at a third time point and sensing the second directional wave at a fourth time point; and a host device communicating with the server; wherein one of the server and the host device determines a first angle of the wave sensor relative to the first wave generator according to a first time difference between the first time point and the second time point, determines a second angle of the wave sensor relative to the second wave generator according to a second time difference between the third time point and the fourth time point, and calculates a position of the server located in the rack according to the first angle and the second angle.

According to the claimed invention, one of the server and the host device stores a look-up table, the look-up table records a plurality of first predetermined time differences, a plurality of first predetermined angles, a plurality of second predetermined time differences and a plurality of second predetermined angles, each of the first predetermined time differences is corresponding to one of the first predetermined angles, each of the second predetermined time differences is corresponding to one of the second predetermined angles, one of the server and the host device compares the first time difference with the first predetermined time differences to determine the first angle from the first predetermined angles and compares the second time difference with the second predetermined time differences to determine the second angle from the second predetermined angles.

According to the claimed invention, one of the server and the host device calculates a first straight line according to the first angle and the first wave generator, calculates a second straight line according to the second angle and the second wave generator, calculates an intersection of the first straight line and the second straight line, and takes the intersection to be the position of the server located in the rack.

According to the claimed invention, the rack has an identification number, the first wave generator transmits a first signal corresponding to the identification number to the host device before emitting the first directional wave, the second wave generator transmits a second signal corresponding to the identification number to the host device before emitting the second directional wave, and the host device identifies the rack according to the first signal and the second signal.

According to the claimed invention, a server management method is used for calculating a position of a server located in a rack, a first wave generator and a second wave generator are disposed on the rack, a wave sensor is disposed on the server, the server management method comprises steps of the first wave generator emitting a first omni-directional wave and the wave sensor sensing the first omni-directional wave at a first time point; the first wave generator emitting a first directional wave and the wave sensor sensing the first directional wave at a second time point; the second wave generator emitting a second omni-directional wave and the wave sensor sensing the second omni-directional wave at a third time point; the second wave generator emitting a second directional wave and the wave sensor sensing the second directional wave at a fourth time point; determining a first angle of the wave sensor relative to the first wave generator according to a first time difference between the first time point and the second time point; determining a second angle of the wave sensor relative to the second wave generator according to a second time difference between the third time point and the fourth time point; and calculating the position of the server located in the rack according to the first angle and the second angle.

According to the claimed invention, the server management method further comprises steps of storing a look-up table, wherein the look-up table records a plurality of first predetermined time differences, a plurality of first predetermined angles, a plurality of second predetermined time differences and a plurality of second predetermined angles, each of the first predetermined time differences is corresponding to one of the first predetermined angles, and each of the second predetermined time differences is corresponding to one of the second predetermined angles; comparing the first time difference with the first predetermined time differences to determine the first angle from the first predetermined angles; and comparing the second time difference with the second predetermined time differences to determine the second angle from the second predetermined angles.

According to the claimed invention, the server management method further comprises steps of calculating a first straight line according to the first angle and the first wave generator; calculating a second straight line according to the second angle and the second wave generator; calculating an intersection of the first straight line and the second straight line; and taking the intersection to be the position of the server located in the rack.

According to the claimed invention, the rack has an identification number, the server management method further comprises steps of the first wave generator transmitting a first signal corresponding to the identification number to the host device before emitting the first directional wave; the second wave generator transmitting a second signal corresponding to the identification number to the host device before emitting the second directional wave; and the host device identifying the rack according to the first signal and the second signal.

As mentioned in the above, the invention disposes two wave generators on the rack and disposes a wave sensor on the server, wherein each of the wave generators is capable of emitting an omni-directional wave and a directional wave. When the wave sensor senses the omni-directional wave and the directional wave at different time points, one of the server and the host device is capable of determining two angles of the wave sensor relative to the two wave generators according to time differences and then calculating the position of the server located in the rack according to the two angles. Therefore, when a manager wants to know the newest server information, he/she only has to drive the two wave generators to emit the omni-directional waves and the directional waves, and then one of the server and the host device will automatically calculate the position of the server located in the race and automatically update the server management database. Accordingly, the manager can know the real status of each server well in time.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
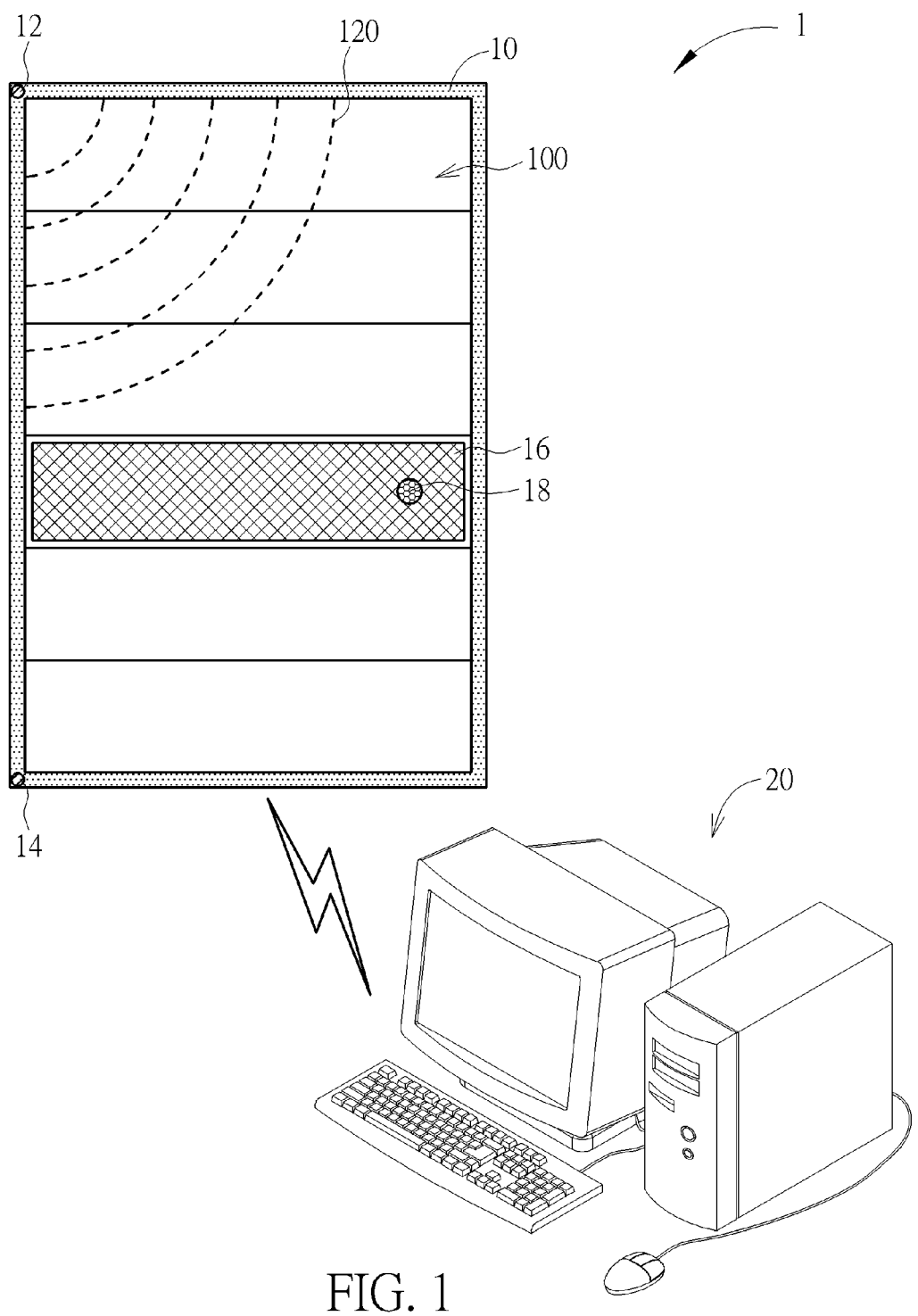
FIG. 1 is a schematic diagram illustrating a server management system according to an embodiment of the invention, wherein a first wave generator emits a first omni-directional wave.
Figure 2:
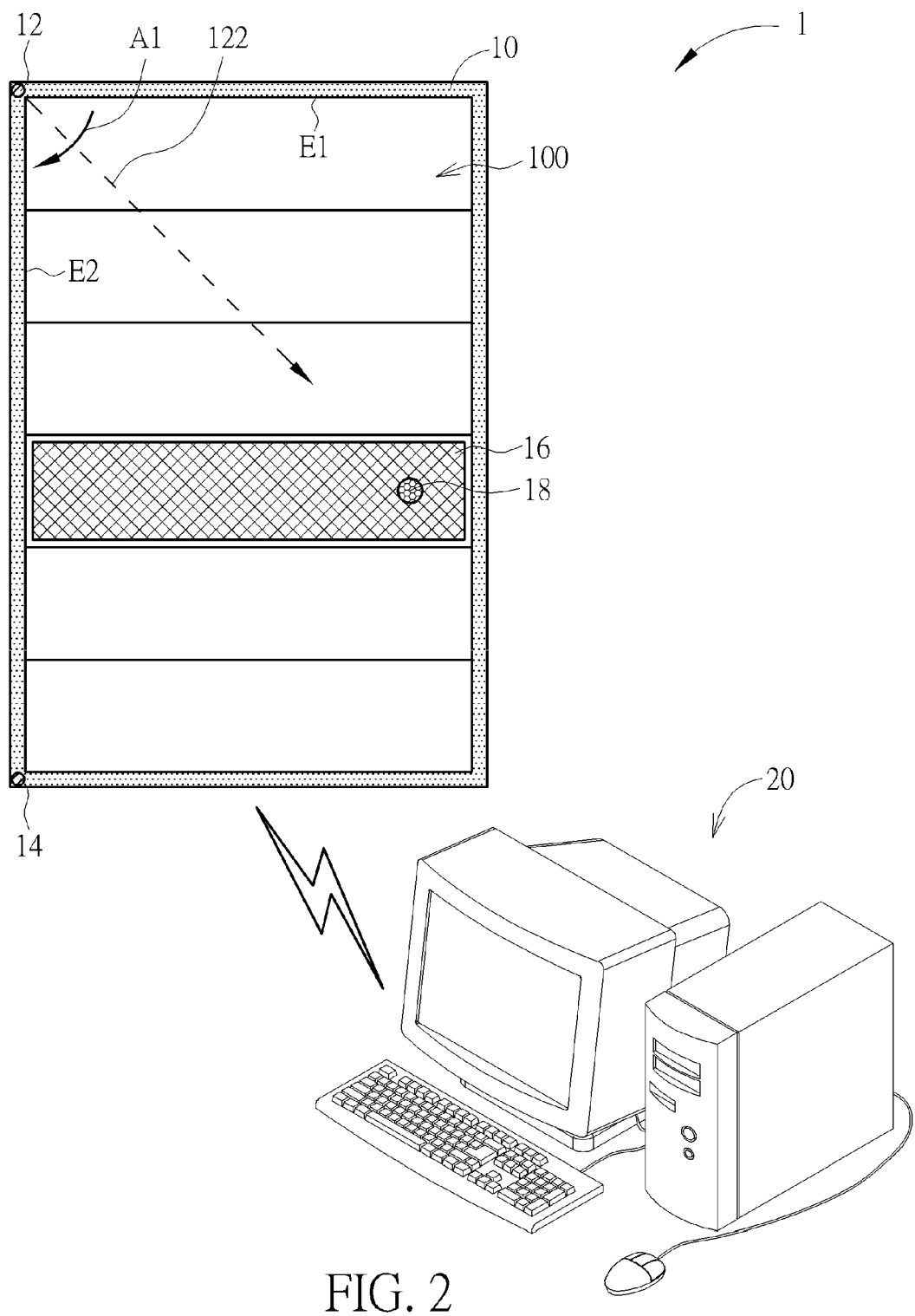
FIG. 2 is a schematic diagram illustrating a first directional wave emitted by the first wave generator shown in FIG. 1.
Figure 3:
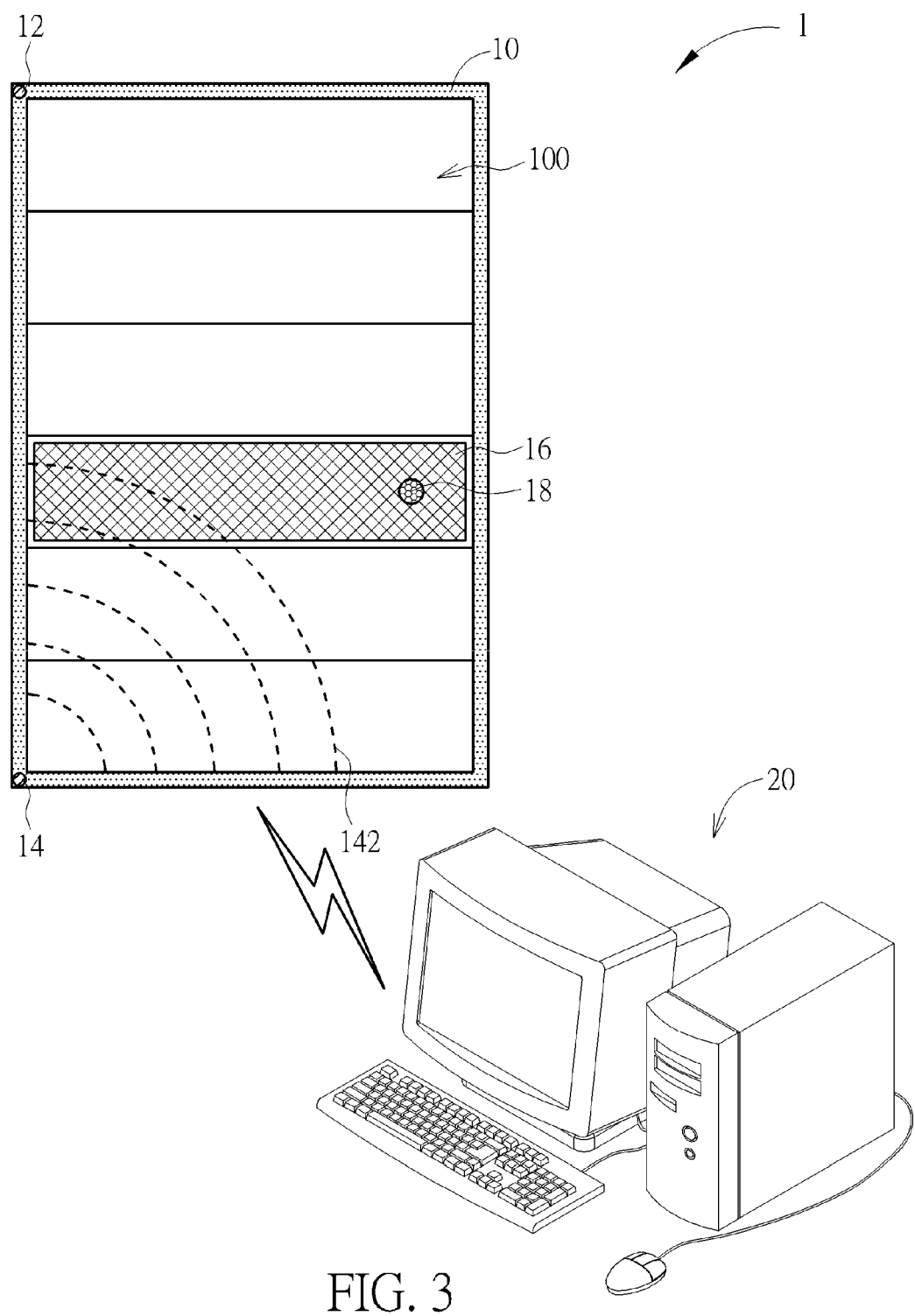
FIG. 3 is a schematic diagram illustrating a second omni-directional wave emitted by a second wave generator shown in FIG. 1.
Figure 4:
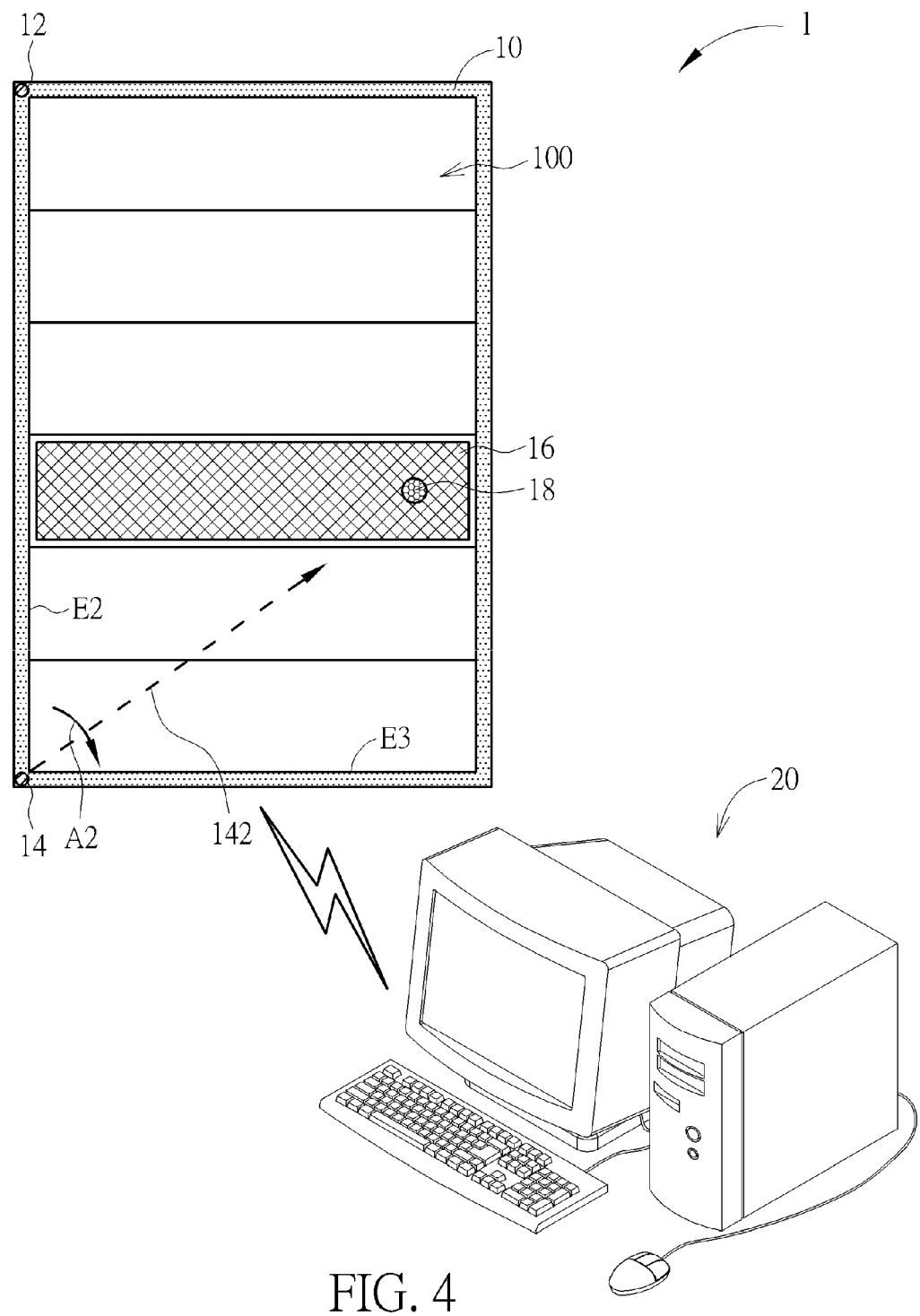
FIG. 4 is a schematic diagram illustrating a second directional wave emitted by the second wave generator shown in FIG. 1.
Figure 5:
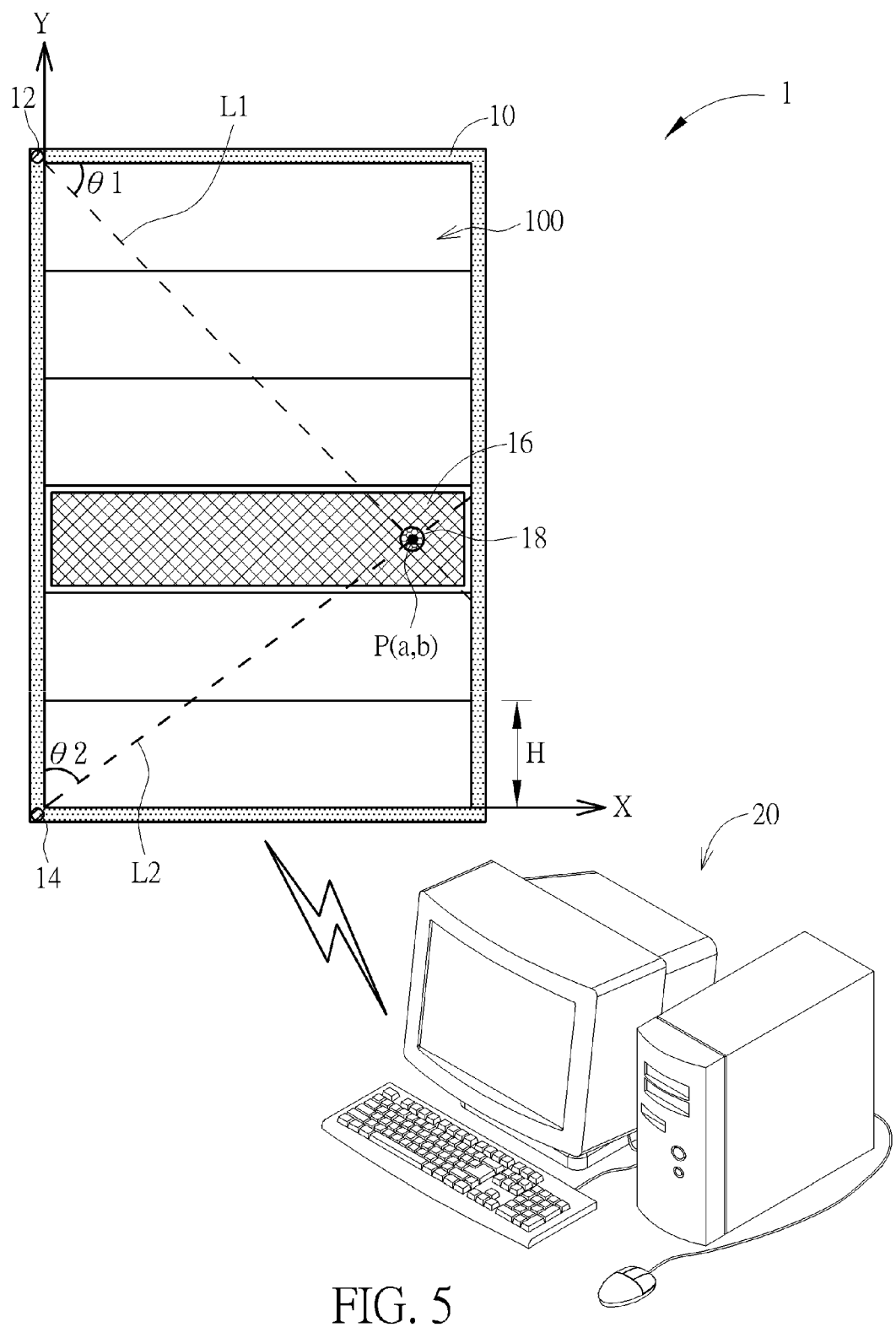
FIG. 5 is a schematic diagram illustrating how to calculate a position of a server located in a rack.

Referring to FIGS. 1 to 5, FIG. 1 is a schematic diagram illustrating a server management system 1 according to an embodiment of the invention, wherein a first wave generator 12 emits a first omni-directional wave 120; FIG. 2 is a schematic diagram illustrating a first directional wave 122 emitted by the first wave generator 12 shown in FIG. 1; FIG. 3 is a schematic diagram illustrating a second omni-directional wave 140 emitted by a second wave generator 14 shown in FIG. 1; FIG. 4 is a schematic diagram illustrating a second directional wave 142 emitted by the second wave generator 14 shown in FIG. 1; and FIG. 5 is a schematic diagram illustrating how to calculate a position P of a server 16 located in a rack 10.

As shown in FIGS. 1 to 5, the server management system 1 comprises a rack 10, a first wave generator 12, a second wave generator 14, a server 16, a wave sensor 18 and a host device 20. The first wave generator 12 and the second wave generator 14 are disposed on the rack 10. In this embodiment, the first wave generator 12 and the second wave generator 14 are disposed on, but not limited to, two corners of the rack 10. The invention may dispose the first wave generator 12 and the second wave generator 14 on any positions of the rack 10 according to practical applications. The server 16 is disposed in the rack 10. In this embodiment, the server 16 may be a computing server, a storage server, a network server or other servers according to practical applications. Furthermore, the rack 10 may have a plurality of accommodating recesses 100 and the server 16 is disposed in one of the accommodating recesses 100. The wave sensor 18 is disposed on the server 16. In this embodiment, the wave sensor 18 may be disposed on, but not limited to, a front cover of the server 16. The invention may dispose the wave sensor 18 on any positions of the server 16 according to practical applications. The host device 20 communicates with the server 16. In this embodiment, the host device 20 and the server 16 may communicate with each other through wired or wireless manner. Moreover, the host device 20 may comprise a computer, a display device and/or other necessary devices according to practical applications. In this embodiment, a server management software may be installed in the host device 20. The server management software can render a server management interface in the display device for a manager to monitor the server 16.

In this embodiment, the first wave generator 12 is used for emitting a first omni-directional wave 120 (as shown in FIG. 1) and a first directional wave 122 (as shown in FIG. 2), and the second wave generator 14 is used for emitting a second omni-directional wave 140 (as shown in FIG. 3) and a second directional wave 142 (as shown in FIG. 4). When the manager wants to know the newest position information of the server 16, he/she can operate the host device 20 to execute the server management software of the invention. At this time, the first wave generator 12 emits the first omni-directional wave 120 (as shown in FIG. 1) first, such that the wave sensor 18 senses the first omni-directional wave 120 at a first time point T1. Afterward, the first wave generator 12 emits the first directional wave 122 (as shown in FIG. 2) and the moving direction of the first directional wave 122 changes from an edge E1 toward another edge E2 of the rack 10 (i.e. the direction indicated by an arrow A1 shown in FIG. 2), such that the wave sensor 18 senses the first directional wave 122 at a second time point T2. Then, the second wave generator 14 emits the second omni-directional wave 140 (as shown in FIG. 3), such that the wave sensor 18 senses the second omni-directional wave 140 at a third time point T3. Finally, the second wave generator 14 emits the second directional wave 142 (as shown in FIG. 4) and the moving direction of the second directional wave 142 changes from the edge E2 toward another edge E3 of the rack 10 (i.e. the direction indicated by an arrow A2 shown in FIG. 4), such that the wave sensor 18 senses the second directional wave 142 at a fourth time point T4.

In this embodiment, the first wave generator 12 and the second wave generator 14 may emit waves with the same wavelength. For example, the first wave generator 12 and the second wave generator 14 may emit infrared or other light with specific wavelength. In this case, the invention may sequentially drive the first wave generator 12 to emit the first omni-directional wave, drive the first wave generator to emit the first directional wave, drive the second wave generator to emit the second omni-directional wave, and then drive the second wave generator to emit the second directional wave. In other words, the first wave generator 12 and the second wave generator 14 have to emit the aforesaid waves at different time points, so as to prevent the waves from interfering with each other. However, in another embodiment, the first wave generator 12 and the second wave generator 14 may emit waves with different wavelengths. For example, the first wave generator 12 may emit red light and the second wave generator 14 may emit blue light. In this case, the invention may simultaneously drive the first wave generator 12 and the second wave generator 14 to emit the first omni-directional wave 120 and the second omni-directional wave 140 first and then simultaneously drive the first wave generator 12 and the second wave generator 14 to emit the first directional wave 122 and the second directional wave 142.

After completing the aforesaid processes, the wave sensor 18 records the first time point T1, the second time point T2, the third time point T3 and the fourth time point T4. In this embodiment, the position of the server 16 located in the rack 10 may be calculated by the server 16 or the host device 20 according to the first time point T1, the second time point T2, the third time point T3 and the fourth time point T4. In other words, the server 16 may calculate the position P (as shown in FIG. 5) of the server 16 located in the rack 10 by itself and then transmit the position P of the server 16 located in the rack 10 to the host device 20, so as to update the server management database or, alternatively, the server 16 may transmit the first time point T1, the second time point T2, the third time point T3 and the fourth time point T4 to the host device 20 and then the host device 20 calculates the position P of the server 16 located in the rack 10 and updates the server management database.

As shown in FIG. 5, one of the server 16 and the host device 20 can determine a first angle θ1 of the wave sensor 18 relative to the first wave generator 12 according to a first time difference TD1 between the first time point T1 and the second time point T2 (i.e. TD1=T2−T1), determine a second angle θ2 of the wave sensor 18 relative to the second wave generator 14 according to a second time difference TD2 between the third time point T3 and the fourth time point T4 (i.e. TD2=T4−T3), and calculate the position P of the server 18 located in the rack 10 according to the first angle θ1 and the second angle θ2.

In this embodiment, one of the server 16 and the host device 20 may store a look-up table as Table 1 shown below, and the look-up table records a plurality of first predetermined time differences, a plurality of first predetermined angles, a plurality of second predetermined time differences and a plurality of second predetermined angles, wherein each of the first predetermined time differences is corresponding to one of the first predetermined angles and each of the second predetermined time differences is corresponding to one of the second predetermined angles.

TABLE 1

| Look-up table | | | |
|---|---|---|---|
| First predetermined time difference | First predetermined angle | Second predetermined time difference | Second predetermined angle |
| X1_1 | Y1_1 | X2_1 | Y2_1 |
| X1_2 | Y1_2 | X2_2 | Y2_2 |
| X1_3 | Y1_3 | X2_3 | Y2_3 |
| ... | ... | ... | ... |
| X1_n | Y1_n | X2_n | Y2_n |

Therefore, one of the server 16 and the host device 20 can use the look-up table shown in Table 1 to compare the first time difference TD1 with the first predetermined time differences X1_1-X1_n to determine the first angle θ1 from the first predetermined angles Y1_1-Y1_n and compare the second time difference TD2 with the second predetermined time differences X2_1-X2_n to determine the second angle θ2 from the second predetermined angles Y2_1-Y2_n. For example, if the first time difference TD1 is equal to the first predetermined time difference X1_2, the first angle θ1 is equal to the first predetermined angle Y1_2; if the second time difference TD2 is equal to the second predetermined time difference X2_3, the second angle θ2 is equal to the second predetermined angle Y2_3; and so on.

In this embodiment, the second wave generator 14 may be defined as an origin of a rectangular coordinate system, the edge E3 of the rack 10 may be defined as an X-axis, and the edge E2 of the rack 10 may be defined as a Y-axis, as shown in FIG. 5. After obtaining the first angle θ1 and the second angle θ2, one of the server 16 and the host device 20 can calculate a first straight line L1 according to the first angle θ1 and the first wave generator 12 and calculate a second straight line L2 according to the second angle θ2 and the second wave generator 14. Then, one of the server 16 and the host device 20 can calculate an intersection P of the first straight line L1 and the second straight line L2 and take the intersection P to be the position P of the server 16 located in the rack 10. Finally, the host device 20 can utilize the position P to update the server management database, such that the manager can know the real status of the server 16 well in time.

Still further, as shown in FIG. 5, it is assumed that the height of each accommodating recess 100 of the rack 10 is represented by H and the coordinate of the position P is represented by (a,b). The invention may round up b/H to an integer to estimate that the server 16 is located in which accommodating recess 100. For example, if 2H<b/H<3H, the invention may determine that the server 16 is located in the third accommodating recess 100 from bottom to top. Accordingly, the server management software may generate a schematic diagram illustrating the rack 10 and the server 16 in the server management interface for the manager to monitor the server 16.

Figure 6:
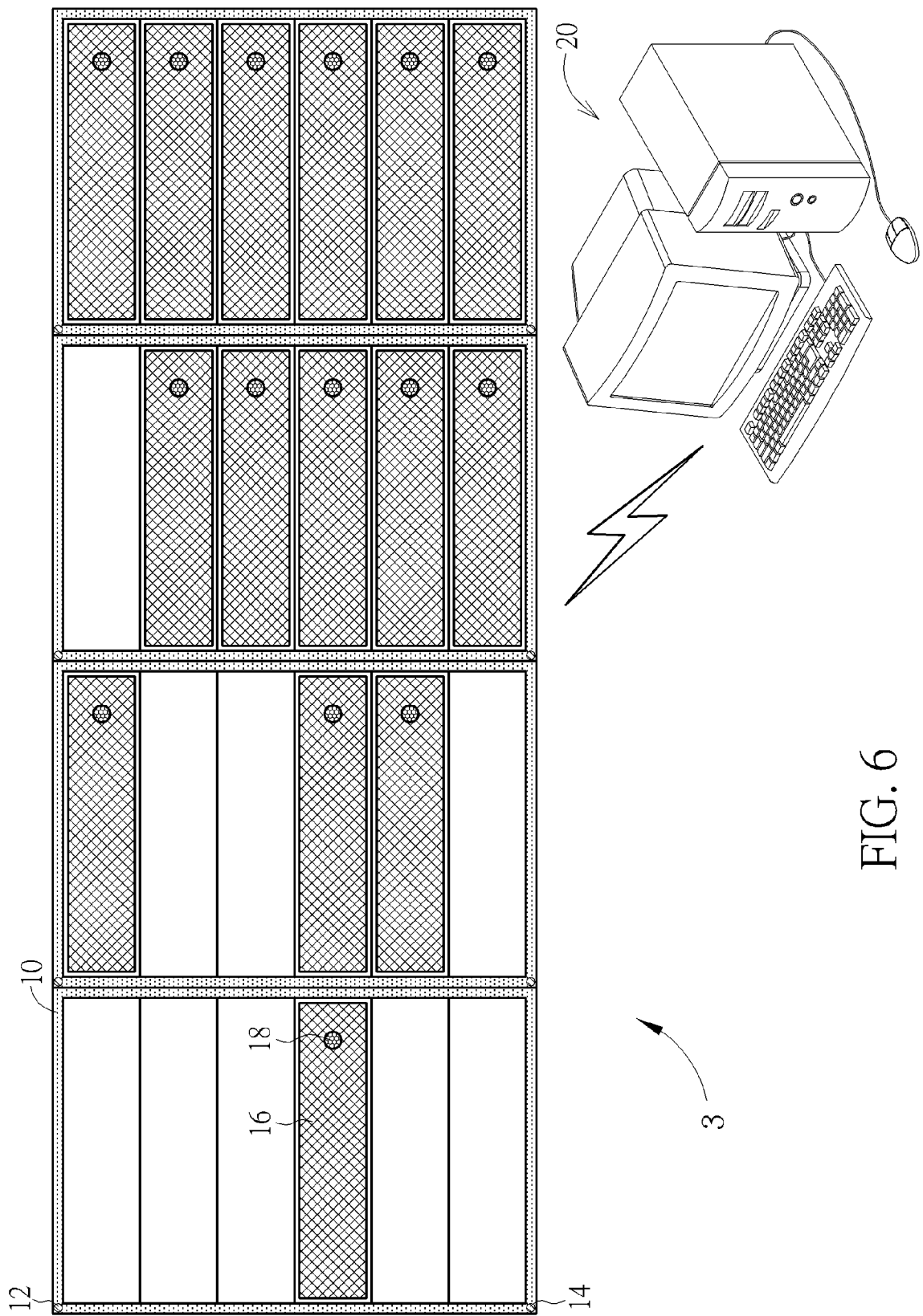
FIG. 6 is a schematic diagram illustrating a server management system according to another embodiment of the invention.

Referring to FIG. 6, FIG. 6 is a schematic diagram illustrating a server management system 3 according to another embodiment of the invention. The main difference between the server management system 3 and the aforesaid server management system 1 is that the server management system 3 comprises a plurality of racks 10 and a plurality of servers 16, as shown in FIG. 6. Furthermore, each of the racks 10 is equipped with a first wave generator 12 and a second wave generator 14, and each of the servers 16 is equipped with a wave sensor 18. It should be noted that the operation principles of the first wave generator 12, the second wave generator 14 and the wave sensor 18 are mentioned in the above, so those will not be depicted herein again. In this embodiment, each of the racks 10 may have an identification number. The first wave generator 12 may transmit a first signal corresponding to the identification number to the host device 20 before emitting the aforesaid first directional wave 122, and the second wave generator 14 may transmit a second signal corresponding to the identification number to the host device 20 before emitting the aforesaid second directional wave 142. Accordingly, the host device 20 can identify the related information of each rack 10 according to the first signal and the second signal. Therefore, the server management system 3 can update the position information of the servers 16 located in all of the racks 10 simultaneously. In this embodiment, the first signal and the second signal may encode the aforesaid identification number in, but not limited to, Morse code.

Figure 7:
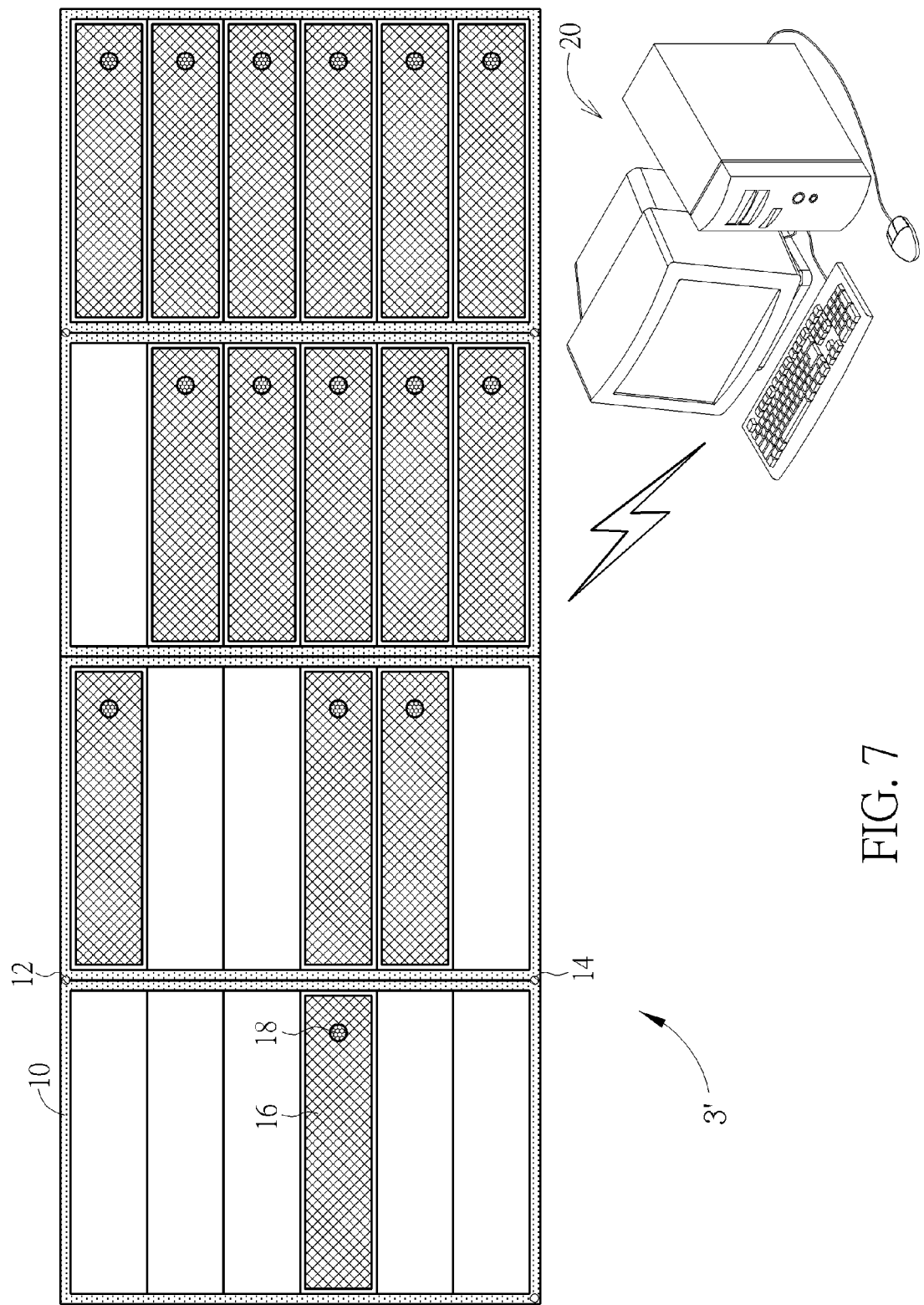
FIG. 7 is a schematic diagram illustrating a server management system according to another embodiment of the invention.

Referring to FIG. 7, FIG. 7 is a schematic diagram illustrating a server management system 3' according to another embodiment of the invention. The main difference between the server management system 3' and the aforesaid server management system 3 is that every two adjacent racks 10 of the server management system 3' share one set of first wave generator 12 and second wave generator 14, as shown in FIG. 7. Accordingly, the cost of the invention can be further reduced. It should be noted that the operation principles of the first wave generator 12, the second wave generator 14 and the wave sensor 18 are mentioned in the above, so those will not be depicted herein again.

Figure 8:
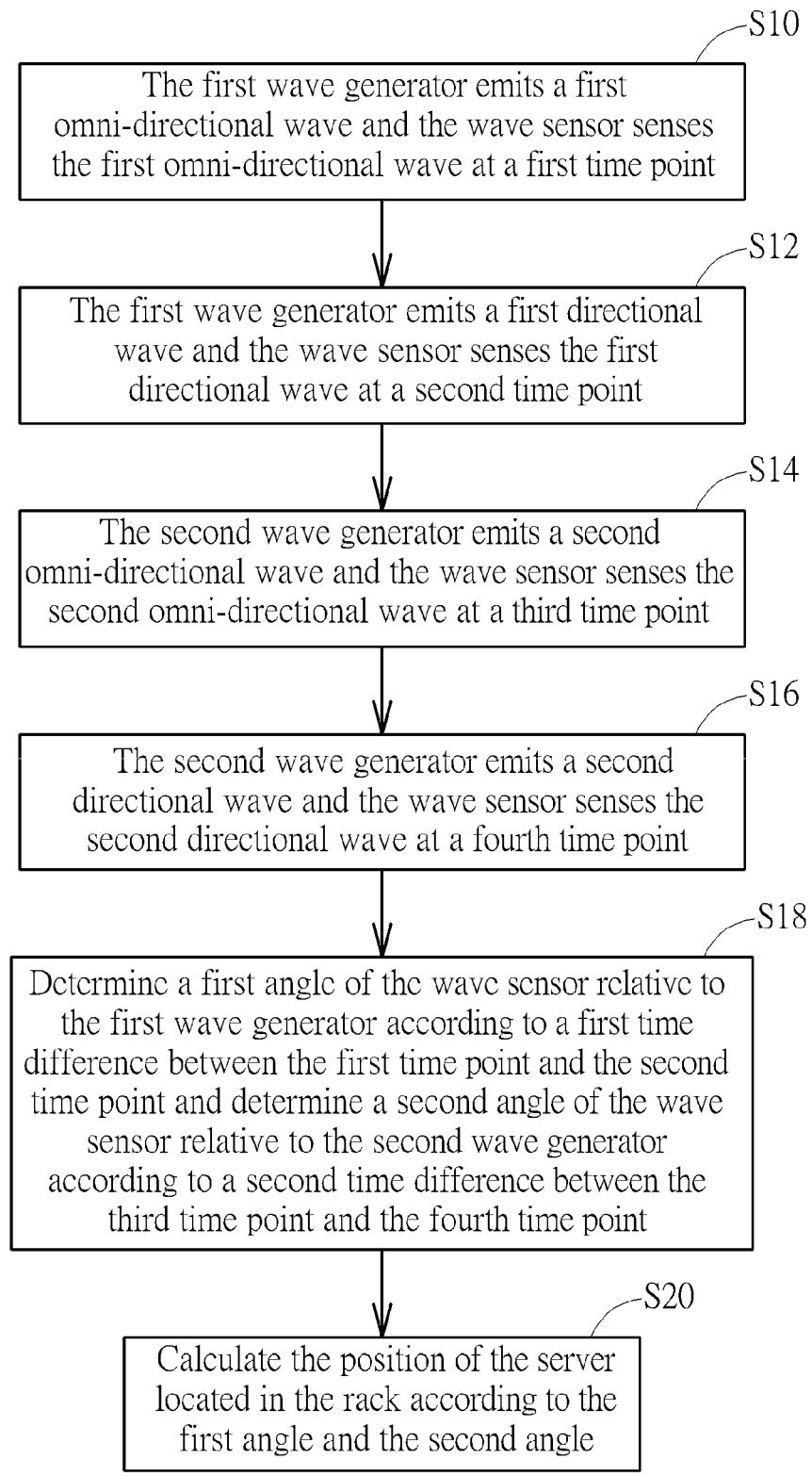
FIG. 8 is a flowchart illustrating a server management method according to an embodiment of the invention.

Referring to FIG. 8, FIG. 8 is a flowchart illustrating a server management method according to an embodiment of the invention. The server management method shown in FIG. 8 is adapted to the server management system 1, 3, 3' shown in FIGS. 1 to 7. Furthermore, the control logic of the server management method shown in FIG. 8 can be implemented by circuit and software designs. First of all, in step S10, the first wave generator 12 emits a first omni-directional wave 120 and the wave sensor 18 senses the first omni-directional wave 120 at a first time point T1. Afterward, in step S12, the first wave generator 12 emits a first directional wave 122 and the wave sensor 18 senses the first directional wave 122 at a second time point T2. Then, in step S14, the second wave generator 14 emits a second omni-directional wave 140 and the wave sensor 18 senses the second omni-directional wave 140 at a third time point T3. Then, is step S16, the second wave generator 14 emits a second directional wave 142 and the wave sensor 18 senses the second directional wave 142 at a fourth time point T4. Then, step S18 is performed to determine a first angle θ1 of the wave sensor 18 relative to the first wave generator 12 according to a first time difference TD1 between the first time point T1 and the second time point T2 and determine a second angle θ2 of the wave sensor 18 relative to the second wave generator 14 according to a second time difference TD2 between the third time point T3 and the fourth time point T4. Finally, step S20 is performed to calculate the position P of the server 16 located in the rack 10 according to the first angle θ1 and the second angle θ2. It should be noted that the other operation principles of the server management method of the invention are mentioned in the above and those will not be depicted herein again.

As mentioned in the above, the invention disposes two wave generators on the rack and disposes a wave sensor on the server, wherein each of the wave generators is capable of emitting an omni-directional wave and a directional wave. When the wave sensor senses the omni-directional wave and the directional wave at different time points, one of the server and the host device is capable of determining two angles of the wave sensor relative to the two wave generators according to time differences and then calculating the position of the server located in the rack according to the two angles. Therefore, when a manager wants to know the newest server information, he/she only has to drive the two wave generators to emit the omni-directional waves and the directional waves, and then one of the server and the host device will automatically calculate the position of the server located in the race and automatically update the server management database. Accordingly, the manager can know the real status of each server well in time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A server management system comprising:
a rack;
a first wave generator disposed on the rack and used for emitting a first omni-directional wave and a first directional wave;
a second wave generator disposed on the rack and used for emitting a second omni-directional wave and a second directional wave;
a server disposed in the rack;
a wave sensor disposed on the server, the wave sensor sensing the first omni-directional wave at a first time point, sensing the first directional wave at a second time point, sensing the second omni-directional wave at a third time point and sensing the second directional wave at a fourth time point; and
a host device communicating with the server;
wherein one of the server and the host device determines a first angle of the wave sensor relative to the first wave generator according to a first time difference between the first time point and the second time point, determines a second angle of the wave sensor relative to the second wave generator according to a second time difference between the third time point and the fourth time point, and calculates a position of the server located in the rack according to the first angle and the second angle.

2. The server management system of claim 1, wherein one of the server and the host device stores a look-up table, the look-up table records a plurality of first predetermined time differences, a plurality of first predetermined angles, a plurality of second predetermined time differences and a plurality of second predetermined angles, each of the first predetermined time differences is corresponding to one of the first predetermined angles, each of the second predetermined time differences is corresponding to one of the second predetermined angles, one of the server and the host device compares the first time difference with the first predetermined time differences to determine the first angle from the first predetermined angles and compares the second time difference with the second predetermined time differences to determine the second angle from the second predetermined angles.

3. The server management system of claim 1, wherein one of the server and the host device calculates a first straight line according to the first angle and the first wave generator, calculates a second straight line according to the second angle and the second wave generator, calculates an intersection of the first straight line and the second straight line, and takes the intersection to be the position of the server located in the rack.

4. The server management system of claim 1, wherein the rack has an identification number, the first wave generator transmits a first signal corresponding to the identification number to the host device before emitting the first directional wave, the second wave generator transmits a second signal corresponding to the identification number to the host device before emitting the second directional wave, and the host device identifies the rack according to the first signal and the second signal.

5. A server management method for calculating a position of a server located in a rack, a first wave generator and a second wave generator being disposed on the rack, a wave sensor being disposed on the server, the server management method comprising:

the first wave generator emitting a first omni-directional wave and the wave sensor sensing the first omni-directional wave at a first time point;

the first wave generator emitting a first directional wave and the wave sensor sensing the first directional wave at a second time point;

the second wave generator emitting a second omni-directional wave and the wave sensor sensing the second omni-directional wave at a third time point;

the second wave generator emitting a second directional wave and the wave sensor sensing the second directional wave at a fourth time point;

determining a first angle of the wave sensor relative to the first wave generator according to a first time difference between the first time point and the second time point;

determining a second angle of the wave sensor relative to the second wave generator according to a second time difference between the third time point and the fourth time point; and calculating the position of the server located in the rack according to the first angle and the second angle.

6. The server management method of claim 5, further comprising:

storing a look-up table, wherein the look-up table records a plurality of first predetermined time differences, a plurality of first predetermined angles, a plurality of second predetermined time differences and a plurality of second predetermined angles, each of the first predetermined time differences is corresponding to one of the first predetermined angles, and each of the second predetermined time differences is corresponding to one of the second predetermined angles;

comparing the first time difference with the first predetermined time differences to determine the first angle from the first predetermined angles; and comparing the second time difference with the second predetermined time differences to determine the second angle from the second predetermined angles.

7. The server management method of claim 5, further comprising:

calculating a first straight line according to the first angle and the first wave generator;

calculating a second straight line according to the second angle and the second wave generator;

calculating an intersection of the first straight line and the second straight line; and taking the intersection to be the position of the server located in the rack.

8. The server management method of claim 5, wherein the rack has an identification number, the server management method further comprises:

the first wave generator transmitting a first signal corresponding to the identification number to the host device before emitting the first directional wave;

the second wave generator transmitting a second signal corresponding to the identification number to the host device before emitting the second directional wave; and the host device identifying the rack according to the first signal and the second signal.

* * * * *